(12) United States Patent
Von Thal et al.

(10) Patent No.: US 7,185,854 B2
(45) Date of Patent: Mar. 6, 2007

(54) IN-FLIGHT REFUELING SYSTEM AND METHOD FOR EXTENDING AND RETRACTING AN IN-FLIGHT REFUELING DEVICE

(75) Inventors: German Von Thal, Santa Maria, CA (US); Harry W. Slusher, Fountain Valley, CA (US); Stephen M. Stecko, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 39 days.

(21) Appl. No.: 10/872,225

(22) Filed: Jun. 18, 2004

(65) Prior Publication Data

US 2006/0000950 A1    Jan. 5, 2006

(51) Int. Cl.
*B64D 39/02* (2006.01)

(52) U.S. Cl. .................... 244/135 A; 244/136

(58) Field of Classification Search ............ 244/135 A, 244/136, 135 R; 310/12
See application file for complete search history.

(56) References Cited

U.S. PATENT DOCUMENTS

| 4,540,144 A | * | 9/1985 | Perrella ................. 244/135 A |
| 5,249,924 A | * | 10/1993 | Brum ........................ 416/48 |
| 5,810,292 A | * | 9/1998 | Garcia et al. ........... 244/135 A |

* cited by examiner

*Primary Examiner*—Timothy D. Collins
(74) *Attorney, Agent, or Firm*—Alston & Bird LLP

(57) ABSTRACT

An in-flight refueling system and method are provided to extend and retract an in-flight refueling device between a stowed position and an extended position relative to a tanker aircraft. The system and method of the present invention provide an induction device configured to extend and retract the in-flight refueling device such that the in-flight refueling system requires less maintenance and may be packaged in a compact, low-profile arrangement so that the in-flight refueling system may be carried by a variety of tanker aircraft in a variety of different configurations.

10 Claims, 6 Drawing Sheets

IN-FLIGHT REFUELING SYSTEM AND METHOD FOR EXTENDING AND RETRACTING AN IN-FLIGHT REFUELING DEVICE

FIELD OF THE INVENTION

The present invention relates generally to in-flight refueling, and specifically, providing a low-profile in-flight refueling system and method for extending an in-flight refueling device from a stowed position in a tanker aircraft and retracting the in-flight refueling device from an extended position relative to the tanker aircraft. The system and method of the present invention further provide a substantially frictionless system via, in some embodiments, a linear induction motor (LIM), for extending and retracting in-flight refueling devices wherein the system is relatively compact and may be easily adapted to fit within various types and configurations of tanker aircraft.

BACKGROUND OF THE INVENTION

In-flight refueling (or air-to-air refueling) is an important method for extending the range of aircraft traveling long distances over areas having no feasible landing or refueling points. Tanker aircraft have been developed which have the capability of refueling a receiver aircraft while in flight. Tanker aircraft are typically converted cargo variants of large civil aircraft wherein at least one in-flight refueling device has been added such that aircraft fuel may be transferred from an internal and/or external tank carried by the tanker aircraft, via the in-flight refueling device, to a receiver aircraft while both the tanker and receiver aircraft are in flight.

There are currently two primary systems for in-flight refueling. One system is the boom refueling system. The boom refueling system typically comprises a rigid boom extending from a tanker aircraft. At one end of the boom is an in-flight refueling device comprising an extendable refueling tube wherein the extendable refueling tube is stowed concentrically within the boom and is further configured to telescope outward from the boom. Also disposed on the boom end are airfoils, which are controlled by a refueling system operator such as, for instance, a boom operator, onboard the tanker aircraft. The airfoils provide maneuverability of the boom with respect to a receiver aircraft. The operator of the receiver aircraft must maneuver the receiver aircraft to within an in-flight refueling position, below and aft of the tanker aircraft. Upon maneuvering into the in-flight refueling position, the boom operator onboard the tanker aircraft may control the airfoils to position the boom into a position relative to the second aircraft such that the boom operator may extend the extendable refueling tube into a refueling connection with a fuel receptacle disposed on the receiver aircraft. The mechanisms for extending and/or retracting the extendable refueling tube may include, for instance, electromechanical components, hydromechanical components, pulleys, cables, sprockets and/or chains.

Another type of refueling system is the probe and drogue system. In the probe and drogue system, an in-flight refueling device comprising an elongate hose is trailed behind the tanker aircraft. Attached at the end of the hose is a funnel-shaped drogue. The receiver aircraft is provided with a probe that is flown by its operator into the drogue such that the probe engages the end of the hose and thus comes into fluid communication therewith such that in-flight refueling may commence. In many cases, as the receiver aircraft contacts the drogue, the probe pushes the drogue forward such that slack is developed in the refueling hose that must be taken up by the probe and drogue system. The hose is typically stored on a rotating drum housed within the fuselage of the tanker aircraft or an externally-mounted pod such that the hose may be reeled out to its trailing position behind the tanker aircraft and reeled back in to take up slack in the refueling hose and/or stow the refueling hose at the conclusion of an in-flight refueling operation. The mechanisms for extending and/or retracting the hose and drogue may include, for instance the drum assembly, electric and/or hydraulic motors, tension sensors for sensing tension levels in the refueling hose, and pressure sensors for determining fuel flow in the refueling hose.

For both types of in-flight refueling systems, the extension and retraction of a refueling device (a drogue in the hose and drogue system and an extendable refueling tube in the boom system) is actuated by electromechanical, and or hydromechanical systems that are subject to wear and may require substantial maintenance in order to be kept in proper working order. In addition, the various drum and mechanical reel components utilized to stow the refueling hose in the probe and drogue refueling system require a large amount of space to be carried by a tanker aircraft, thereby taking up cargo space that would otherwise be available within the tanker aircraft, as well as limiting the types of aircraft that may serve as tanker aircraft.

Therefore, there exists a need for an in-flight refueling system and method for extending and retracting in-flight refueling devices, such as, for instance, the refueling hose and attached drogue and the extendable refueling tube used in the boom in-flight refueling system, wherein the in-flight refueling system is robust, requires a minimum number of moving mechanical parts, and may be suited for installation in a variety of different configurations to be carried by various types of tanker aircraft. In addition, there exists a need for an in-flight refueling system that provides a more compact alternative to the rotating drum currently used to extend and retract the refueling hose and attached drogue used in probe and drogue refueling systems.

SUMMARY OF THE INVENTION

The embodiments of the present invention satisfy the needs listed above and provide other advantages as described below. The in-flight refueling system of the present invention, which is adapted to be carried by a tanker aircraft, comprises an in-flight refueling device configured to be capable of extending from the tanker aircraft, and an induction device configured to extend and retract the in-flight refueling device between a stowed position and an extended position relative to the tanker aircraft. According to some embodiments the in-flight refueling system may further comprise a magnetic device operably engaged with the in-flight refueling device wherein the induction device is capable of interacting with the magnetic device to extend and retract the in-flight refueling device.

According to some embodiments, the in-flight refueling device is a fuel conduit, such as, for example, a substantially rigid extendable refueling tube configured to be capable of extending from the tanker aircraft, or an elongate hose having one end operably engaged with the tanker aircraft and a drogue operably engaged with an opposing end, and wherein the induction device is further configured to extend and retract the fuel conduit. For embodiments wherein the in-flight refueling device is an elongate hose, the in-flight refueling system may further comprise a tension measurement device operably engaged with hose to determine a tension in the hose between the tanker aircraft and the drogue. In addition, the induction device may be further configured to cooperate with the tension measuring device to extend and retract the hose so as to control the tension in the hose between the tanker aircraft and the drogue. The system embodiments of the present invention may also allow for the in-flight refueling device to be stowed in a more compact arrangement within or outside a fuselage or within at least one wing of the tanker aircraft. In addition, the in-flight refueling system may further allow for hose embodiments of the in-flight refueling device to be stowed in a more compact arrangement within a pod that is adapted to be carried by the tanker aircraft.

According to one embodiment of the present invention, an in-flight refueling system is provided wherein the system comprises a tanker aircraft comprising a fuselage and at least one wing, a substantially rigid tube carried by the tanker aircraft, and an elongate hose carried by the tanker aircraft wherein the elongate hose is configured to be capable of being stowed in a stowed position within the rigid tube. The elongate hose is further configured to be capable of extending telescopically out of the substantially rigid tube to an extended position relative to the tanker aircraft. In other advantageous embodiments, the substantially rigid tube may be disposed substantially within the fuselage and/or the at least one wing of the tanker aircraft such that the elongate hose may be further configured to be capable of extending substantially out of the substantially rigid tube to an extended position substantially outside the fuselage and/or the at least one wing of the tanker aircraft.

The embodiments of the present invention also provide a method for in-flight refueling from a tanker aircraft comprising the following steps: extending an in-flight refueling device to an extended position relative to the tanker aircraft wherein the in-flight refueling device is operably engaged with an induction device to extend the in-flight refueling device such that the extended in-flight refueling device is capable of refueling a receiver aircraft; and retracting the in-flight refueling device from the extended position to a stowed position relative to the tanker aircraft using the induction device. In addition, some method embodiments of the present invention, wherein the in-flight refueling device further comprises an elongate hose, may further comprise the steps of: determining a tension in the elongate hose, via a tension measuring device configured to determine the tension in the hose between the tanker aircraft and the drogue; and extending and retracting the hose using the induction device, wherein the induction device may cooperate with the tension measuring device so as to control the tension in the hose between the tanker aircraft and the drogue. Other method embodiments of the present invention may further comprise the steps of: providing a variable magnetic field, via the induction device, along a longitudinal axis of the in-flight refueling device; varying the magnetic field along the longitudinal axis of the in-flight refueling device; and actuating the in-flight refueling device using the variable magnetic field. Other method embodiments may further comprise the step of attaching a magnetic device to the in-flight refueling device, wherein the magnetic device is configured to respond to the variable magnetic field provided by the induction device so as to extend and retract the in-flight refueling device along the longitudinal axis of the in-flight refueling device.

Advantages provided by embodiments of the present invention may include, but are not limited to, the provision of a robust in-flight refueling system for extending and retracting an in-flight refueling device having fewer moving parts such that the complexity and size of the in-flight refueling system is reduced relative to conventional systems. Other advantages include providing an in-flight refueling system that can be adapted to extend and retract several types of in-flight refueling devices between a stowed position and an extended position relative to a tanker aircraft. Embodiments of the present invention also provide the advantage of providing an in-flight refueling system that is compact and low-profile such that the in-flight refueling system may be carried by a variety of tanker aircraft types and in a variety of positions both within and outside a fuselage of a tanker aircraft.

These advantages and others that will be evident to those skilled in the art are provided in the in-flight refueling system and method of the present invention.

BRIEF DESCRIPTION OF THE DRAWINGS

Figure 1A:
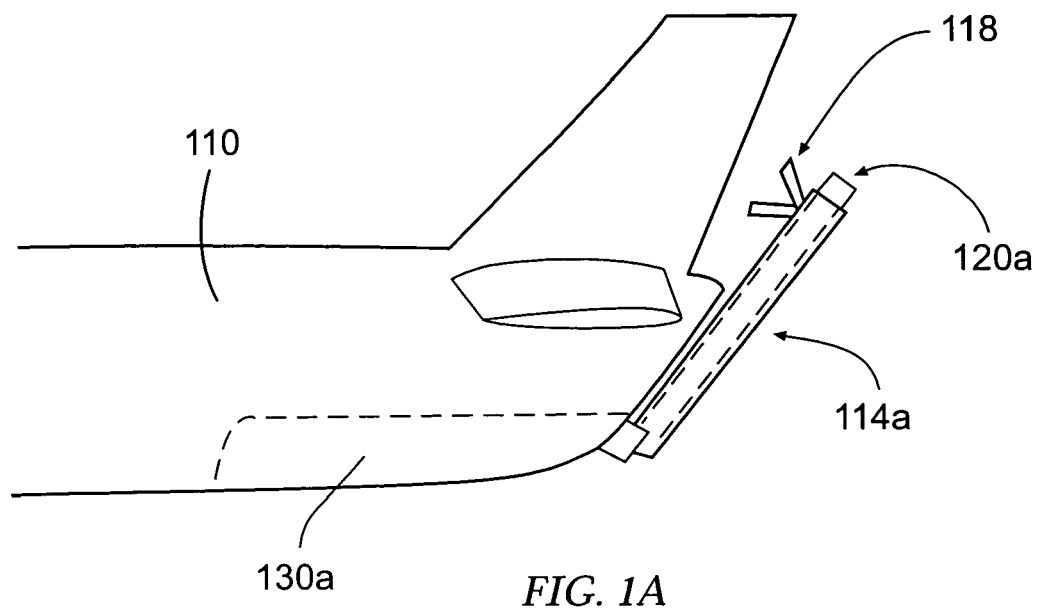
Figure 1B:
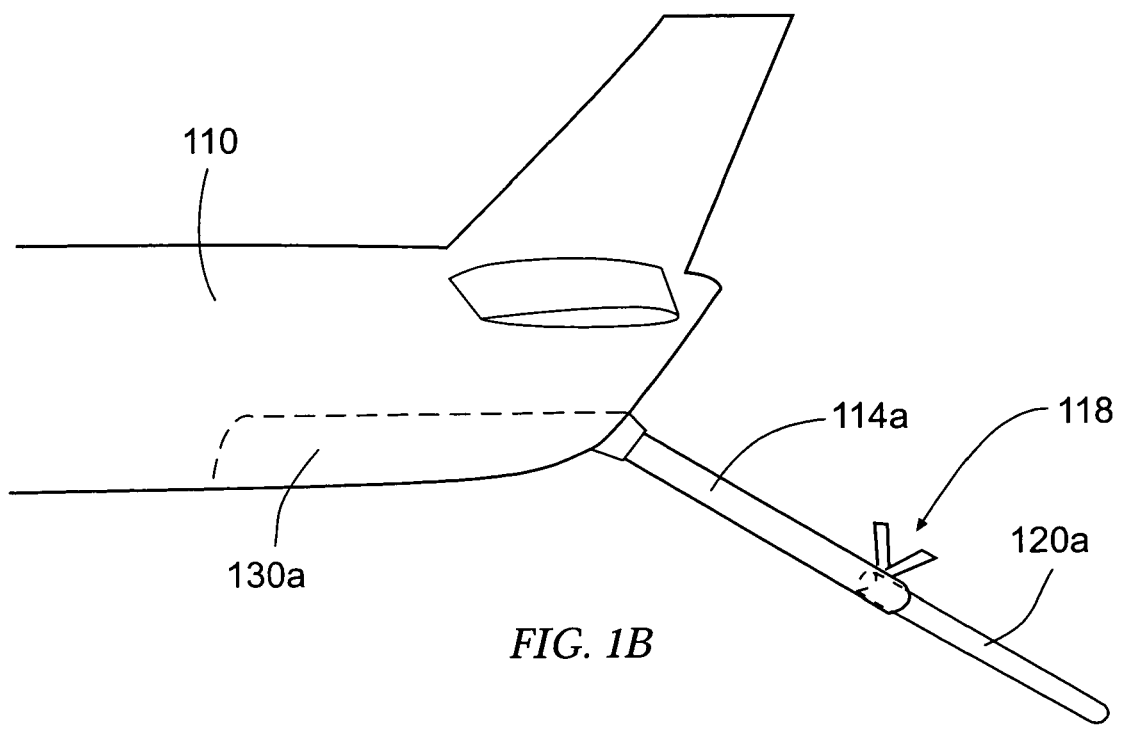
Figure 2A:
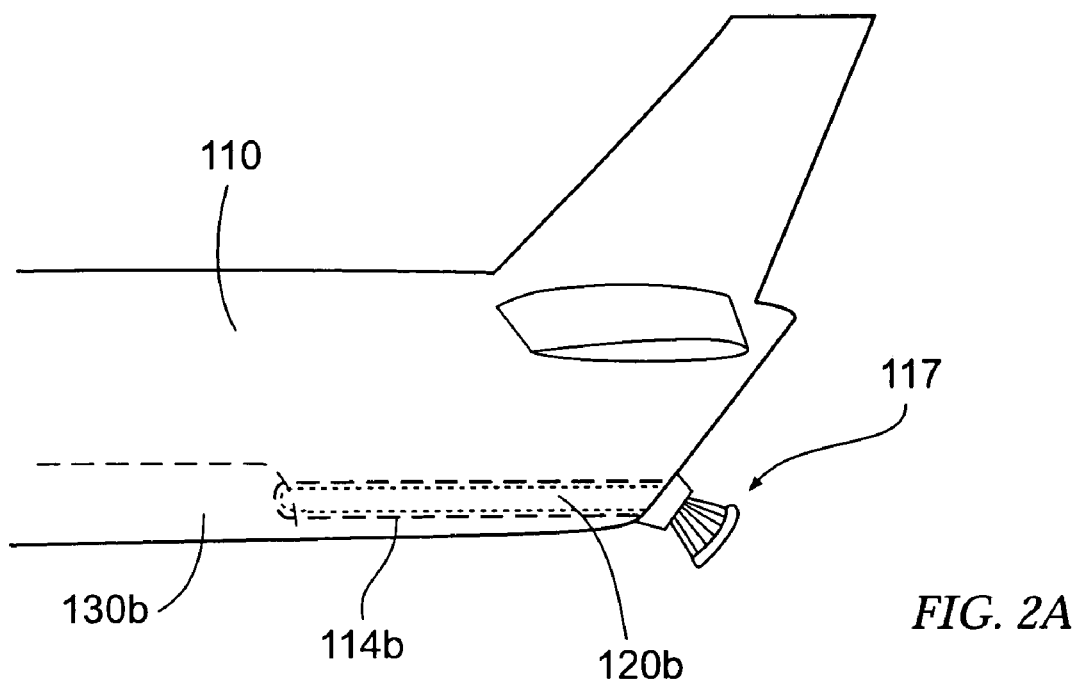
Figure 2B:
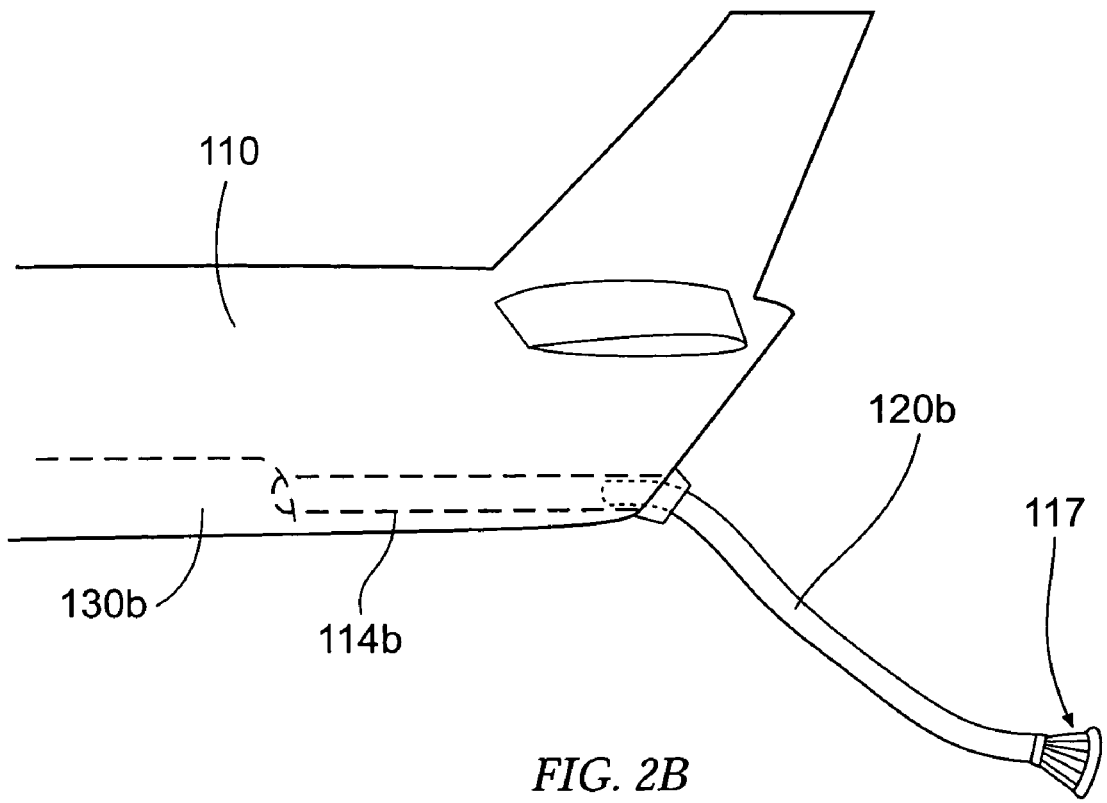
Figure 3:
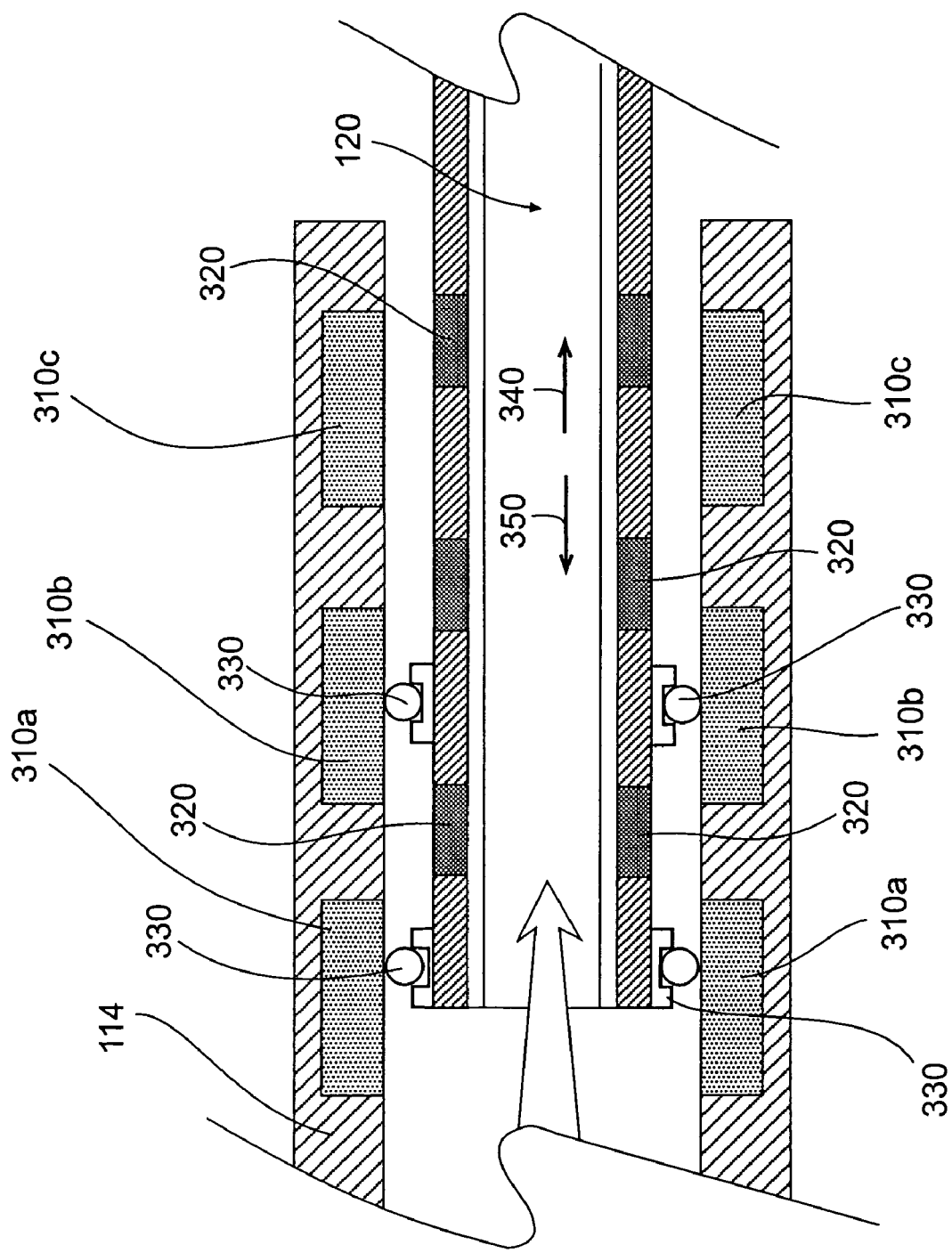
Figure 4:
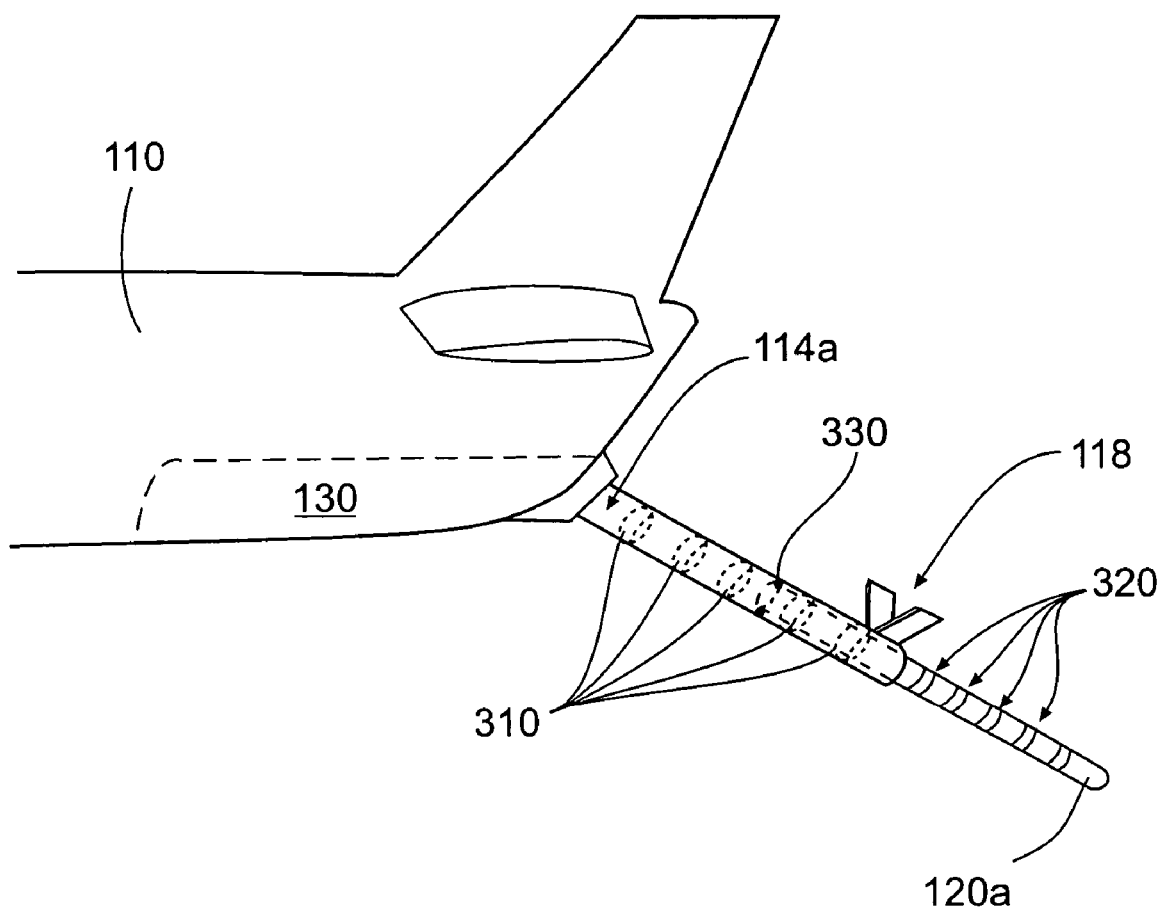
Figure 5:
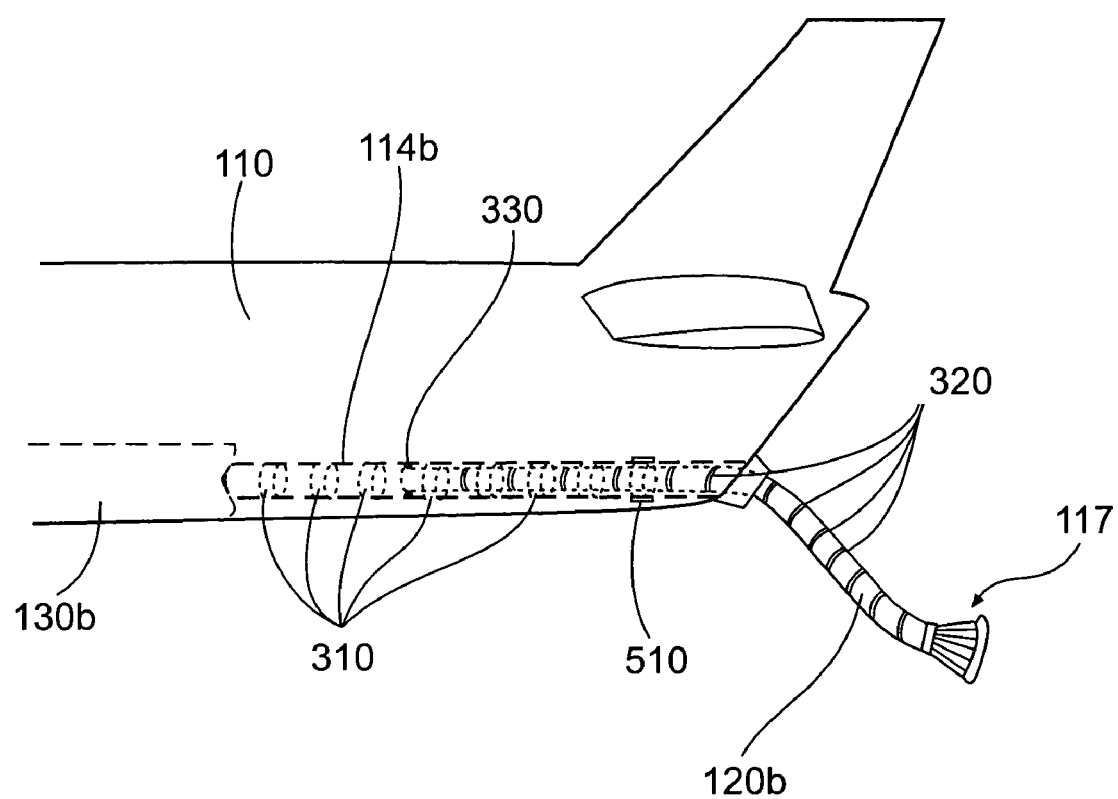
Figure 6:
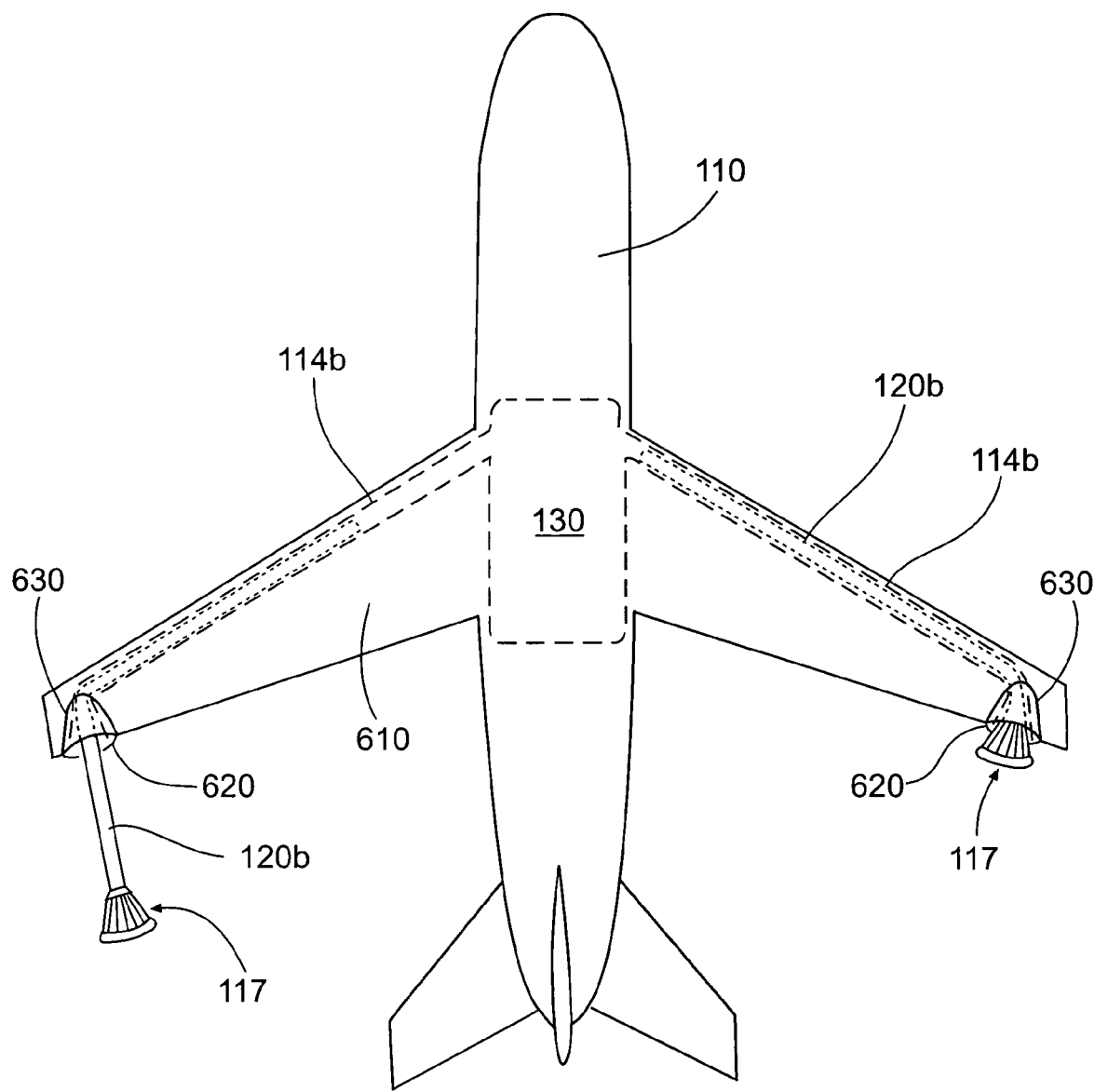

Having thus described the invention in general terms, reference will now be made to the accompanying drawings, which are not necessarily drawn to scale, and wherein:

FIG. 1A shows a side view of a tanker aircraft carrying a boom refueling system wherein the in-flight refueling device is in the stowed position;

FIG. 1B shows a side view of a tanker aircraft carrying a boom refueling system wherein the in-flight refueling device is in the extended position;

FIG. 2A shows a side view of a tanker aircraft carrying a probe and drogue refueling system wherein the in-flight refueling device is in the stowed position;

FIG. 2B shows a side view of a tanker aircraft carrying a probe and drogue refueling system wherein the in-flight refueling device is in the extended position;

FIG. 3 shows a side cross-section of the in-flight refueling system according to one embodiment of the present invention including the position of an in-flight refueling device relative to an induction device;

FIG. 4 shows a side view of a tanker aircraft carrying a boom refueling system wherein the boom refueling system is equipped with an in-flight refueling system according to one embodiment of the present invention;

FIG. 5 shows a side view of a tanker aircraft carrying a probe and drogue refueling system wherein the probe and drogue refueling system is equipped with an in-flight refueling system according to one embodiment of the present invention; and FIG. 6 shows a top view of a tanker aircraft carrying a probe and drogue refueling system wherein the elongate hose operably engaged with a drogue may be stowed concentrically within a substantially rigid tube carried within at least one wing of the tanker aircraft.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the in-flight refueling system and method embodiments of the present invention are described below in the context of the transfer of fuel from a tanker aircraft 110 during an in-flight refueling operation, it should be understood that the embodiments of the present invention may also be utilized to extend and retract a variety of devices used in aviation applications where low-profile, low maintenance, and high reliability systems are preferred, such as, for instance, the extension and retraction of refueling probes on a receiver aircraft, the extension and retraction of antennae, the actuation of stowed weapon systems, and/or other applications that may be appreciated by one skilled in the art.

FIGS. 1A and 2A generally show a tanker aircraft 110 equipped with an in-flight refueling device 120 (such as, for instance a substantially rigid extendable refueling tube 120a, or an elongate hose 120b) configured to transfer fuel from a fuel reservoir 130a, 130b carried by the tanker aircraft 110 to a receiver aircraft (not shown) that may approach the tanker aircraft 110 from the aft and below so as to assume an in-flight refueling position relative to the tanker aircraft 110. FIGS. 1A and 2A also show the in-flight refueling device 120a, 120b in a stowed position relative to the tanker aircraft 110.

More specifically, FIG. 1A shows a tanker aircraft 110 carrying a boom in-flight refueling system wherein the in-flight refueling device 120 comprises a substantially rigid extendable refueling tube 120a configured to extend telescopically from the stowed position within a boom 114a carried by the tanker aircraft. The position of the boom 114a may be controlled by an operator of the in-flight refueling system by actuating airfoils 118 operably engaged with the boom 114a. FIG. 2A shows a tanker aircraft 110 carrying a probe and drogue in-flight refueling system wherein the in-flight refueling device 120b comprises an elongate hose having one end operably engaged with the tanker aircraft 110 at, for instance, a fuel reservoir 130b. The elongate hose 120b may further comprise a drogue 117 operably engaged with an opposing end. As more fully described below, the elongate hose 120b may be stowed concentrically within a substantially rigid fixed tube 114b that may be disposed within or outside a fuselage of the tanker aircraft 110.

FIGS. 1B and 2B generally show the respective in-flight refueling devices 120a, 120b carried by the tanker aircraft 110 in an extended position relative to the tanker aircraft. For example, in FIG. 1B, the substantially rigid extendable refueling tube 120a is shown telescopically extending from the boom 114a so as to maintain an extended position relative to the tanker aircraft 110. In FIG. 2B, the elongate hose 120b and drogue 117 (operably engaged therewith), are shown in an extended position relative to the tanker aircraft 110 such that the elongate hose 120b may extend from the substantially rigid fixed tube 114b and trail aft and below of the tanker aircraft 110 as shown. In other embodiments, the elongate hose 120b and the associated substantially rigid fixed tube 114b within which the elongate hose 120b is housed, may both be disposed substantially within an in-flight refueling system pod configured to be carried by a tanker aircraft 110 at, for instance, an external hardpoint, such as a wing hardpoint, and/or fuselage hardpoint.

FIG. 3 shows a cross section of the in-flight refueling system according to one embodiment of the present invention wherein an in-flight refueling device 120, such as, for instance, a fuel conduit (e.g., substantially rigid extendable refueling tube 120a (see FIGS. 1A and 1B), or elongate hose 120b (see FIGS. 2A and 2B), is shown positioned within a substantially rigid tube 114 such that an induction device 310 (or series of induction devices 310a–c, as shown in FIG. 3), operably engaged with the substantially rigid tube 114, may be configured to extend and retract the in-flight refueling device 120 between a stowed position and an extended position relative to the tanker aircraft 110. Also shown is a sealing device 330 that may be disposed about the in-flight refueling device such that a fluid-tight seal may be maintained between the substantially rigid tube 114 and the in-flight refueling device 120 even as the in-flight refueling device 120 is extended and/or retracted with respect to the substantially rigid tube 114. The sealing device 330 may comprise, for instance, a sliding O-ring seal or other sealing device suitable for providing a fluid tight sliding connection between the substantially rigid tube 114 and the in-flight refueling device 120 housed concentrically therein.

In some embodiments of the system and method of the present invention, the in-flight refueling device 120 may further comprise a magnetic device 320 operably engaged therewith and configured such that the induction device 310 may be magnetically coupled with the magnetic device 320 so as to extend and retract the in-flight refueling device 120. As shown in FIGS. 3, 4, and 5, the magnetic device 320 may further comprise one or more magnetic strips configured to extend circumferentially about the in-flight refueling device 120. As shown in FIG. 3, for example, the magnetic device 320 may include multiple magnetic strips spaced apart from one another along the length of the in-flight refueling device 120. According to other embodiments, the magnetic device 320 may be integrated with the materials of the in-flight refueling device 120. For instance, in some embodiments wherein the in-flight refueling device 120 comprises an elongated hose 120b (as shown in FIG. 2B), the magnetic device 320 may comprise, for instance, magnetic wire integrated into a woven sheath configured to surround the in-flight refueling device 120. One skilled in the art will appreciate that other types of magnetic devices and/or conductive materials may be operably engaged with the in-flight refueling device 120 in a variety of configurations such that the induction device 310 may be magnetically coupled with the magnetic device 320 so as to extend and retract the in-flight refueling device 120. According to some embodiments, an exterior surface of the in-flight refueling device 120 may comprise a variety of materials suitable for serving as a "reaction plate" with respect to an induction device 310 so as to be extended and/or retracted thereby. For instance, the in-flight refueling device 120 may comprise copper, aluminum, steel, or combinations thereof in order to be more suitable for extension and retraction by the linear induction forces generated by the induction device 310.

The induction device 310 of the present invention may further comprise, for instance, a linear induction motor (LIM) configured to extend and/or retract the in-flight refueling device 120 via a traveling magnetic force generated by the induction device 310. The LIM 310 may, in some embodiments further comprise, for example, a coil of conductive wire laminated within an iron core, such that the conductive wire may be connected to an AC power supply so as to energize the induction device 310 for actuating the in-flight refueling device 120 (as described more fully below). One skilled in the art will appreciate that other types of induction device 310 of various compositions and configurations may be utilized in order to provide magnetic actuating forces suitable for extending and retracting the in-flight refueling device 120 relative to the tanker aircraft 110. While FIGS. 3, 4, and 5 show the induction device 310 as a cylindrical structure substantially surrounding the in-flight refueling device 120, one skilled in the art will appreciate that the induction device 310 may also comprise a pair of parallel flat plates such that the in-flight refueling device 120 may be actuated therebetween. In other embodiments, the induction device 310 may comprise a plurality of flat LIM's substantially surrounding the in-flight refueling device 120 so as to extend and retract the in-flight refueling device 120. In other embodiments, multiple LIM configurations may be used in order to provide a more efficient arrangement of the induction device 310 for both extending and retracting the in-flight refueling device 120, and minimizing the use of space aboard the tanker aircraft 110.

As shown schematically in FIG. 3, the induction device 310 may be configured, for instance, to be capable of receiving an AC electrical current provided by, for instance, an AC power supply, so as to generate a magnetic field that may produce a linear actuating magnetic force along a longitudinal axis of the induction device 310 (which may be co-located with a longitudinal axis of the in-flight refueling device 120) to extend and/or retract the in-flight refueling device 120 towards the extended direction 340 and/or the retracted direction 350. Furthermore, according to some embodiments, the AC power supply, and, in turn, the induction device 310 may be generally controlled by an input from an operator of the in-flight refueling system typically located onboard the tanker aircraft 110. In addition, the in-flight refueling system may further comprise, for instance, a computer device, operably engaged with the AC power supply and or the induction device 310 such that the computer device may receive the input from the operator of the in-flight refueling system such that the operator may control the operation of the in-flight refueling system. The computer device may further comprise, for instance, a controller comprised of a microprocessor and/or series of microprocessors suitable for controlling an AC power supply and/or receiving control inputs from an operator. One skilled in the art will appreciate that the computer device may control the frequency, phase, amplitude, and/or other parameters related to the AC electrical current provided by the AC power supply so as to extend, retract, suspend, and/or control the velocity of the in-flight refueling device 120 relative to an induction device 310 or a series of induction devices 310 disposed linearly along a longitudinal axis of the in-flight refueling device, as described below.

As shown in FIG. 3 the in-flight refueling system may comprise a plurality of induction devices 310, such as, for instance, LIM's, arranged in series along a longitudinal axis of the substantially rigid tube 114. As the AC power supply applies an electrical current to the plurality of induction devices 310, the induction devices, in turn produce a magnetic field and a corresponding magnetic force that may act on the in-flight refueling device 120 positioned, for instance, concentrically within the substantially rigid tube 114 and the plurality of induction devices 310. In some embodiments, wherein the in-flight refueling device 120 further comprises a magnetic device 320, the magnetic force may act to repel and/or attract the magnetic device 320 such that the induction device 310 and the magnetic device 320 produce complementary repelling and/or attracting forces which act to suspend the in-flight refueling device 120 typically concentrically within the substantially rigid tube 114 (as shown in FIG. 3). In other embodiments, wherein the in-flight refueling device 120 comprises conductive materials, the applied magnetic field may induce an opposing magnetic field in the conductive materials of the in-flight refueling device 120 such that the induction device 310 and the in-flight refueling device 120 produce complementary repelling forces which act to suspend the in-flight refueling device 120 typically concentrically within the substantially rigid tube 114 (as shown in FIG. 3).

Referring to FIG. 3, in order to accelerate the in-flight refueling device 120 towards the extended direction 340 relative to the substantially rigid tube 114, the operator of the in-flight refueling device (via for instance, the computer device) may control the AC power supply to supply AC electrical currents having successively larger amplitudes to successive induction devices positioned in the retracted direction 350 (to the left side of FIG. 3). For example, greater current may be applied to induction device 310a than to induction device 310b, and greater current may be applied to induction device 310b than to induction device 310c. Thus, the complementary repelling forces between the induction devices 310 and the in-flight refueling device 120 may be adapted to be greater towards the retracted direction 350, and thus, the in-flight refueling device may be extended towards the extended direction 340. The operator (via the computer device) may control the velocity of the extension of the in-flight refueling device 120 by, for instance, altering the difference in the amplitudes of the AC electrical currents applied, for instance, to successive induction devices 310 positioned in the retracted direction 350. One skilled in the art will appreciate that smaller differences in the amplitude of the AC electrical currents applied to successive induction devices will result in a lower extension velocity. One skilled in the art will also appreciate that that AC electrical currents applied to the induction devices 310 may be timed and controlled by, for instance, the computer device, to produce a traveling wave magnetic field in the series of induction devices 310 so as to produce a varying magnetic field configured to extend the in-flight refueling device 120.

Also referring to FIG. 3, in order to retract the in-flight refueling device 120 in the retracted direction 350 relative to the substantially rigid tube 114, the operator of the in-flight refueling device (via for instance, the computer device) may control the AC power supply to supply AC electrical currents having successively larger amplitudes to successive induction devices positioned towards the extended direction 340. For example, greater current may be applied to induction device 310c than to induction device 310b, and greater current may be applied to induction device 310b than to induction device 310a. Thus, the complementary repelling forces between the induction devices 310 and the in-flight refueling device 120 may be adapted to be greater in the extended direction 340, and thus, the in-flight refueling device 120 may be retracted towards the retracted direction 340 (to the right side of FIG. 3). The operator (via the computer device) may control the velocity of the retraction of the in-flight refueling device 120 by, for instance, altering the difference in the amplitudes of the AC electrical currents applied, for instance, to successive induction devices 310 positioned in the extended direction 340. One skilled in the art will also appreciate that that AC electrical currents applied to the induction devices 310 may be timed and controlled by, for instance, the computer device, to produce a traveling wave magnetic field in the series of induction devices 310 so as to produce a varying magnetic field configured to retract the in-flight refueling device 120.

In a similar manner, in some instances, the plurality of induction devices 310, such as, for instance, LIM's, may be energized by respective AC electrical currents having equal amplitudes, such that the complementary repelling forces exerted between the induction devices 310 and the in-flight refueling device 120 may be equivalent along the length of the substantially rigid tube 114 (and the induction devices 310 operably engaged therewith). As such, the complementary repelling forces may act as a static magnetic force to suspend the in-flight refueling device 120 both concentrically and longitudinally within the substantially rigid tube 114 such that the in-flight refueling device 120 may neither extend nor retract relative to the substantially rigid tube 114. Thus, the operator of the in-flight refueling system, may, via the computer device and associated AC power supply, suspend the extension and/or retraction of the in-flight refueling device 120 either in the extended position, the stowed position, or any selected point therebetween.

One skilled in the art will appreciate that successively greater complementary attractive forces generated between, for instance, the induction devices 310 and the in-flight refueling device 120 may also be utilized to extend, and/or retract the in-flight refueling device 120 with respect to the substantially rigid tube 114. Similarly, substantially equivalent complementary attractive forces generated by longitudinally successive induction devices circumferentially surrounding the in-flight refueling device 120 may act to suspend the in-flight refueling device 120 concentrically and longitudinally within the substantially rigid tube 114. In addition, in some embodiments, complementary attractive and/or repellent forces generated by the induction devices 310 with respect to the in-flight refueling device 120 and the magnetic devices 320 and/or conductive materials associated therewith, may be initiated by the AC power supply in response to control inputs produced by a computer device operably engaged therewith so as to extend, retract, and/or suspend the in-flight refueling device 120 relative to the tanker aircraft and the substantially rigid tube 114 carried thereby.

One skilled in the art will also appreciate that the interaction or magnetic coupling between the induction devices 310 and the conductive material and/or magnetic devices 320 operably engaged with the in-flight refueling device 120 may also be used to create linear position information such that the computer device (operably engaged with the AC power supply of the in-flight refueling system of the present invention), may be further adapted to receive position information related to at least one magnetic device 320 with respect to at least one induction device 310 such that the degree of extension and/or retraction of the in-flight refueling device 120 may be determined by the computer device and monitored by an operator of the in-flight refueling system. In addition, the computer device may be configured to act independently, based upon the position information received, to control the AC power supply (and respective induction devices 310 associated therewith) to suspend, extend, and/or retract the in-flight refueling device 120 such that the in-flight refueling device 120 is maintained in a substantially safe position relative to the substantially rigid tube 114. The term "safe" position generally refers to the linear position of the in-flight refueling device 120 that is substantially between the extended position and the stowed position as more specifically described above in relation to FIGS. 1A, 1B, 2A, and 2B. In addition, mechanical or "hard stops" may be further provided as redundant safety systems to prevent over-retraction and/or over-extension of the in-flight refueling device 120 (such as, for instance the substantially rigid extendable refueling tube 120a (FIG. 4), or the elongate hose 120b (FIG. 5) with respect to the tanker aircraft 110.

FIG. 4 shows one embodiment of the in-flight refueling system of the present invention wherein the in-flight refueling device 120 comprises, for instance, a substantially rigid extendable refueling tube 120a that is configured to be stowed in a stowed position concentrically within a substantially rigid tube 114, such as, for instance, a refueling boom 114a. The in-flight refueling system shown in FIG. 4 may also be generally referred to as a boom in-flight refueling system, as discussed above. The substantially rigid extendable refueling tube 120a may be extended telescopically to an extended position from the refueling boom 114a so as to engage a refueling receptacle on a receiver aircraft (not shown) so as to transfer fuel from a fuel reservoir 130 onboard the tanker aircraft 110 to the receiver aircraft.

In order to extend and/or retract the substantially rigid extendable refueling tube 120a at least one induction device 310 is provided within the refueling boom 114a. The induction device 310 may further comprise, for instance, an induction coil configured to be embedded within and/or operably engaged with the refueling boom 114a. One skilled in the art will appreciate that the induction coil may be configured so as to produce linear actuating magnetic forces suitable for retracting, extending, and or statically suspending the substantially rigid extendable refueling tube 120a within the refueling boom 114a (as described more fully above with respect to FIG. 3). Also, the substantially rigid extendable refueling tube 120a may further comprise a magnetic device 320, such as, for instance, one or more magnetic strips extending circumferentially about its outer surface so as to interact with the magnetic field generated by the induction device 310 such that the substantially rigid extendable refueling tube 120a may be extended and/or retracted by the linear actuating magnetic force produced thereby. During in-flight refueling operations, the induction device 310 may thus produce a linear actuating magnetic force so as to extend the substantially rigid extendable refueling tube 120a telescopically with respect to the refueling boom 114a as shown in FIG. 4 so as to extend the substantially rigid extendable refueling tube 120a towards a receiver aircraft positioned, for instance, to the aft and below the tanker aircraft 110. Once the in-flight refueling operation is completed and the receiver aircraft has disconnected from the substantially rigid extendable refueling tube 120a, the induction device 310 may reverse the linear actuating magnetic force and retract the substantially rigid extendable refueling tube 120a.

As such, no moving parts are required to be provided within the in-flight refueling system in order to extend and/or retract the substantially rigid extendable refueling tube 120a. Only an AC power supply (and in some embodiments, a computer device operably engaged therewith) need be provided to supply electrical current to the induction device 310 in order to produce the static force necessary to suspend the substantially rigid extendable refueling tube 120a concentrically within the refueling boom 114a as well as to produce the linear actuating magnetic force required to extend and/or retract the substantially rigid extendable refueling tube 120a with respect to the tanker aircraft 110. Also, as described generally above, a sealing device 330 may be provided and disposed about the substantially rigid extendable refueling tube 120a such that a fluid-tight seal may be maintained between the refueling boom 114a and the substantially rigid extendable refueling tube 120a even as the substantially rigid extendable refueling tube 120a is extended and/or retracted with respect to the refueling boom 114a.

FIG. 5 shows another embodiment of the in-flight refueling system of the present invention wherein the in-flight refueling device 120 comprises, for instance, an elongate hose 120b that is configured to be stowed in a stowed position concentrically within a substantially rigid tube 114b that may be provided within a fuselage of the tanker aircraft 110. The in-flight refueling system shown in FIG. 5 may also be generally referred to as a probe and drogue in-flight refueling system, as one end of the elongate hose 120b may be operably engaged with a drogue 117 that may be configured to receive a refueling probe operably engaged with a receiver aircraft. The elongate hose 120b and drogue 117 may be extended telescopically to an extended position from the substantially rigid tube 114b so as to trail aft and below the aircraft such that the drogue 117 may receive a refueling probe operably engaged with a receiver aircraft (not shown) so as to transfer fuel from a fuel reservoir 130 onboard the tanker aircraft 110 to the receiver aircraft.

In order to extend and/or retract the elongate hose 120b at least one induction device 310 may be provided as shown in FIG. 5. The induction device 310 may further comprise, for instance, an induction coil or LIM configured to be operably engaged with the substantially rigid tube 114b. The LIM and/or induction coil may be configured as shown generally in FIG. 5 so as to produce a linear actuating magnetic force suitable for retracting, extending, and or statically suspending the elongate hose 120b within the substantially rigid tube 114b. Also, the refueling hose 120b may further comprise a magnetic device 320, such as, for instance, one or more magnetic strips extending circumferentially about the outer surface of the elongate hose 120b so as to interact with the magnetic field generated by the induction device 310 such that the elongate hose 120b may be extended and/or retracted by the resulting linear actuating magnetic force produced thereby. During in-flight refueling operations, the induction device 310 may thus produce a linear actuating magnetic force so as to extend and/or retract the elongate hose 120b telescopically with respect to the substantially rigid tube 114b as shown in FIG. 5 so as to trail the elongate hose 120b and drogue 117 aft and below the tanker aircraft 110 so as to provide in-flight refueling to a receiver aircraft fitted with, for instance, a refueling probe configured to be received by the drogue 117. One skilled in the art will appreciate that the elongate hose 120b may also be extended and/or retracted with respect to the substantially rigid tube 114b using mechanical devices, such as, for instance, cables, chains, electromechanical equipment, hydraulic equipment, and/or other mechanical devices. Also, as described generally above, a sealing device 330 may be provided and disposed about the elongate hose 120b such that a fluid-tight seal may be maintained between the substantially rigid tube 114b and the elongate hose 120b even as the elongate hose 120b is extended and/or retracted with respect to the substantially rigid tube 114b.

Due to the linear actuating magnetic force produced by the induction device 310, no moving parts are required to be provided within the in-flight refueling system in order to extend and/or retract the elongate hose 120b with respect to the tanker aircraft 110. As in the boom refueling system embodiments, only an AC power supply (and, in some embodiments, a computer device operably engaged therewith) need be provided to supply electrical current to the induction device 310 in order to produce the static magnetic force necessary to suspend the elongate hose 120b concentrically within the substantially rigid tube 114b as well as to produce the linear actuating magnetic force required to extend and/or retract the elongate hose 120b with respect to the tanker aircraft 110. The induction device 310 and the substantially rigid tube 114b may thus be disposed in a low-profile arrangement such that the elongate hose 120b may be stowed in a configuration having a minimum of bends. For instance, the substantially rigid tube 114b may be disposed within a fuselage of the tanker aircraft 110 below a floor of the cargo areas of the tanker aircraft 110 in a substantially straight configuration (such as that shown in FIG. 5) so as to preserve cargo space onboard the tanker aircraft 110. In addition, low-profile embodiments of the in-flight refueling system may be stowed on an external surface of the tanker aircraft 110 by, for instance, arranging the substantially rigid tube 114b in a substantially conformal arrangement with a fuselage of the tanker aircraft 110 so as to minimize drag and/or disturbances produced by the externally-disposed in-flight refueling system. In general, the low-profile of the induction device 310 and the substantially rigid tube 114b operably engaged therewith, may allow the in-flight refueling system of the present invention to be disposed in a variety of configurations with respect to the tanker aircraft such as: below a floor of a cargo compartment (as shown in FIG. 5), above a ceiling of a cargo compartment, within a wall of a fuselage, inside a wing structure (as shown in FIG. 6), in a conformal arrangement outside a fuselage, and/or any other unused substantially straight cavities and/or apertures within a prospective tanker aircraft. As such, the in-flight refueling system of the present invention may be operably engaged with a variety of tanker aircraft 110 having minimal cargo space available for the mechanical equipment normally utilized to actuate an in-flight refueling system. In addition, the in-flight refueling system of the present invention may also be carried in a substantially elongate configuration by the tanker aircraft 110 so as to more evenly distribute its stowed weight over a larger structural area of the tanker aircraft 110, especially when compared to conventional probe and drogue systems wherein the refueling hose may be stowed on a drum assembly within the tanker aircraft 110 such that the weight of the stowed refueling hose is concentrated around the drum assembly.

In some cases, as shown in FIG. 5, the probe and drogue embodiments of the in-flight refueling system of the present invention may further comprise a tension measurement device 510 operably engaged with the elongate hose 120b to determine a tension in the elongate hose 120b between the tanker aircraft 110 and the drogue 117. The tension measurement device 510 may comprise, for instance, an electronic transducer device that is configured to be in communication with a computer device that, in turn, may be configured to control the operation of the induction device 310. As such the computer device may receive data related to the tension determined by the tension measurement device and thereafter control the induction device 310 such that the tension in the elongate hose 120b between the tanker aircraft 110 and drogue 117 is within a selected range. Thus, the induction device 310 may be further configured to cooperate with the tension measuring device 510 (via, for instance, the computer device in communication therewith) to extend and retract the elongate hose 120b so as to control the tension in the elongate hose 120b between the tanker aircraft 110 and the drogue 117. Therefore, this embodiment may prevent a lack of tension (and excess of slack in the elongate hose 120b) between the tanker aircraft 110 and the drogue 117. Such elongate hose 120b slack may result, for instance, when a receiver aircraft engages a refueling probe with the drogue 117 and thus forces the drogue 117 forward with respect to the tanker aircraft 110. Slack in the elongate hose 120b may, in turn, allow the elongate hose 120b to undulate and oscillate in, for instance, a standing wave, in response to aerodynamic forces exerted thereon such that the elongate hose 120b may strike the tanker aircraft 110 and/or receiver aircraft, causing damage to one or more aircraft during in-flight refueling operations. In addition the tension measurement device 510 may detect a tension in the elongate hose 120b between the tanker aircraft 110 and the drogue 117 that exceeds a selected amount, such as, if the receiver aircraft lags aft of the tanker aircraft 110 while still engaged with the drogue 117. In this case, the tension measurement device 510, in communication with the computer device, may control the induction device to further extend the elongate hose to alleviate the excess tension in the elongate hose 120b. Furthermore, in some embodiments, the tension measurement device 510 may be further configured to communicate with the drogue (via, for instance, the computer device) so as to actuate an electromechanical connection within the drogue 117 so as to disengage the drogue 117 from the receiver aircraft if the detected tension is exceeded while the elongate hose 120b is in the fully extended position.

Thus, the tension measuring device 510, in cooperation with the induction device 310 (via, for instance, the computer device) may act to maintain a selected tension range in the elongate hose and/or reduce slack in the elongate hose 120b between the tanker aircraft 110 and the drogue 117 according to some advantageous embodiments of the present invention. One skilled in the art will appreciate that the tension measuring device 510 may comprise, for instance, a strain gage operably engaged with the elongate hose, configured to send, via wire or wireless methods, data related to the tension to the induction device 310 to the computer device operably engaged with the AC power supply and/or induction device 310. In other embodiments, the tension measuring device may further comprise, for instance, a transducer device (that may communicate with the induction device 310, via, for instance, a computer device) configured to detect changes in the static magnetic force generated by the induction device 310 in order to hold the elongate hose 120b in the extended position relative to the tanker aircraft 110, as such changes may indicate, for instance, variations in the tension of the elongate hose 120b resulting, for instance, from slack being developed in the elongate hose 120b between the drogue 117 and the tanker aircraft 110. Thus, the transducer device may, in cooperation with the computer device that may control the induction device 310, act to alleviate a tension in the elongate hose that is outside of a selected range.

FIG. 6 shows another embodiment of the probe and drogue refueling system of the present invention wherein the in-flight refueling device 120 comprises, for instance, an elongate hose 120b operably engaged with a drogue 117 wherein the elongate hose 120b is configured to be stowed in a stowed position concentrically within a substantially rigid tube 114b that may be provided within at least one wing 610 of the tanker aircraft 110. The end of the elongate hose 120b operably engaged with the drogue 117 may emerge from the at least one wing 610 via an aperture 620 defined in, for instance, a trailing edge, of the at least one wing 610. In addition, the aperture may be surrounded by a fairing 630 configured to shroud the drogue 117 when the elongate hose 120b is in the stowed position concentrically within the substantially rigid tube 114b. Thus, the elongate hose 120b and drogue 117 may be extended telescopically to an extended position from the substantially rigid tube 114b so as to trail aft and below the at least one wing 610 of the tanker aircraft 110 such that the drogue 117 may receive a refueling probe operably engaged with a receiver aircraft (not shown) so as to transfer fuel from a fuel reservoir 130 onboard the tanker aircraft 110 to the receiver aircraft.

According to some embodiments, the elongate hose 120b may be extended, retracted, and/or suspended with respect to the substantially rigid tube 114b using an induction device 310 in-flight refueling system as described more particularly above with respect to FIG. 3. One skilled in the art will appreciate, however, that the elongate hose 120b may also be actuated relative to the substantially rigid tube 114b using mechanical equipment such as, for instance, cables, chains, electromechanical equipment, hydraulic equipment, and/or other mechanical devices.

Thus, the low-profile arrangement provided by embodiments of the in-flight refueling system of the present invention allows the elongate hose 120b to be stowed concentrically within the substantially rigid tube 114b. This embodiment may thus further allow the in-flight refueling system to be disposed substantially within the at least one wing 610 of the tanker aircraft 110. As such, the in-flight refueling system may minimize drag, air disturbances, and/or concentrations of weight on the at least one wing 610 of the tanker aircraft 610, especially when compared to conventional pod-mounted in-flight refueling systems that may be carried, for instance, in external pods mounted to wing hardpoints and/or pylons at one or more discrete points under a wing of a tanker aircraft.

One skilled in the art will appreciate that existing in-flight refueling technology may be utilized in conjunction with the induction device 310, magnetic device 320, substantially rigid tube 114, and in-flight refueling device 120 of the embodiments of the present invention in order to modify the in-flight refueling system and add safety, control, and/or efficiency features. For instance, a guillotine system may be provided in probe and drogue embodiments (see FIG. 5) of the present invention wherein a guillotine may, in emergency situations, cut the elongate hose 120b and simultaneously seal a severed end of the elongate hose 120b such that the elongate hose may be jettisoned from the tanker aircraft 110 in situations wherein the in-flight refueling system is damaged or fails in some manner to retract the elongate hose 120b. In addition, fuel pumps, valves, and conduits for connecting the in-flight refueling system of the present invention to a fuel reservoir 130 and for managing a flow of fuel from the in-flight refueling system to a receiver aircraft, may be added in accordance with the design of conventional in-flight refueling systems. In some embodiments, mechanical systems may be added in order to provide redundant and/or primary systems for extending and/or retracting the in-flight refueling device 120 relative to the substantially rigid tube 114.

Referring again to FIGS. 3, 4, and 5, a method for in-flight refueling from a tanker aircraft 110 is described. The method embodiments of the present invention comprise the steps of: establishing a magnetic coupling between an induction device 310 and an in-flight refueling device 120; and extending the in-flight refueling device 120 to an extended position relative to the tanker aircraft 110 as a result of the magnetic coupling established by the induction device 310, such that the extended in-flight refueling device 120 is adapted to engage a receiver aircraft in an in-flight refueling operation. According to other method embodiments, the method may further comprise retracting the in-flight refueling device 120 from the extended position to a stowed position relative to the tanker aircraft 110 using the induction device 310 once the in-flight refueling operation is completed.

As shown, for example, in FIG. 5, some method embodiments of the present invention are advantageously used in conjunction with probe and drogue refueling systems such that the in-flight refueling device 120 further comprises an elongate hose 120b having one end operably engaged with the tanker aircraft 110 and the opposing end operably engaged with a drogue 117. Such method embodiments may further comprise the steps of: determining a tension in the elongate hose 120b between the tanker aircraft 110 and the drogue 117; and extending and retracting the elongate hose 120b as a result of the magnetic coupling established by the induction device 310, so as to control the tension in the elongate hose 120b between the tanker aircraft 110 and the drogue 117. As described above, this method embodiment may prevent the development of slack in the elongate hose 120b between the tanker aircraft 110 and the drogue 117 so as to further prevent oscillation and/or standing wave formation in the elongate hose 120b as it is in the extended position relative to the tanker aircraft 110.

According to other method embodiments, as shown generally in FIG. 3, the method for in-flight refueling from a tanker aircraft 110 may further comprise the steps of providing a variable magnetic field, via the induction device 310, along a longitudinal axis of the in-flight refueling device 120; varying the variable magnetic field along the longitudinal axis of the in-flight refueling device 120; and actuating the in-flight refueling device 120 via the variable magnetic field. In other embodiments, the method may further comprise the step of providing an alternating electrical current to the induction device 310 such that the induction device 310 provides the variable magnetic field in response to the alternating electrical current. Furthermore, according to some advantageous embodiments, the method may further comprise attaching a magnetic device 320 to the in-flight refueling device 120, wherein the magnetic device 320 may be configured to respond to the variable magnetic field provided by the induction device 310 so as to extend and retract the in-flight refueling device 120 between a stowed position (see generally, FIGS. 1A and 2A) and an extended position (see generally, FIGS. 1B and 2B) relative to the induction device 310 along the longitudinal axis. Also, as shown in FIG. 3, other method embodiments may further comprise surrounding the in-flight refueling device 120 with the induction device 310 such that the in-flight refueling device 120 is configured to be positioned concentrically within the induction device 310, and subjecting the in-flight refueling device 120 and the magnetic device 320 attached thereto to the variable magnetic field so as to telescopically extend and telescopically retract the in-flight refueling device 120 between a stowed position (see generally, FIGS. 1A and 2A) and an extended position (see generally, FIGS. 1B and 2B) relative to the induction device. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An in-flight refueling system adapted to be carried by a tanker aircraft, the refueling system comprising:
    an in-flight refueling device configured to be capable of extending from the tanker aircraft; and
    a linear induction device configured to extend and retract the in-flight refueling device between a stowed position and an extended position relative to the tanker aircraft.

2. An in-flight refueling system according to claim 1, wherein the in-flight refueling device is a fuel conduit.

3. An in-flight refueling system according to claim 1 further comprising a magnetic device operably engaged with the in-flight refueling device and configured such that the induction device is capable of interacting with the magnetic device to extend and retract the in-flight refueling device.

4. An in-flight refueling system according to claim 2, wherein the in-flight refueling device further comprises a substantially rigid extendable refueling tube configured to be capable of extending from the tanker aircraft.

5. An in-flight refueling system according to claim 2, wherein the in-flight refueling device further comprises an elongate hose having one end operably engaged with the tanker aircraft and a drogue operably engaged with an opposing end thereof, and wherein the induction device is further configured to extend and retract the elongate hose between a stowed position and an extended position relative to the tanker aircraft.

6. An in-flight refueling system according to claim 5, further comprising a tension measurement device operably engaged with the elongate hose to determine a tension therein between the tanker aircraft and the drogue, the induction device being fun her configured to cooperate with the tension measuring device to extend and retract the elongate hose so as to control the tension in the elongate hose between the tanker aircraft and the drogue.

7. An in-flight refueling system according to claim 1, wherein the induction device further comprises a longitudinal axis, the induction device being configured to provide a variable magnetic field being configured to vary along the longitudinal axis, the variable magnetic field being farther configured to interact with the in-flight refueling device such that the induction device is further configured to extend and retract the in-flight refueling device between a stowed position and an extended position relative to the tanker aircraft.

8. An in-flight refueling system according to claim 7, further comprising an electrical source configured to provide an alternating electrical current to the induction device such that the induction device provides the variable magnetic field in response to the alternating electrical current.

9. An in-flight refueling system according to claim 7, further comprising a magnetic device configured to surround the in-flight refueling device, the magnetic device being further configured so as to respond to the variable magnetic field provided by the induction device so as to extend and retract the in-flight refueling device between a stowed position and an extended position relative to the induction device along the longitudinal axis.

10. An in-flight refueling system according to claim 9, wherein the induction device further comprises a cylindrical structure configured to surround the in-flight refueling device, and wherein the magnetic device further comprises a cylindrical band configured to surround the in-flight refueling device in a fixed arrangement concentrically within the cylindrical structure of the induction device, the magnetic device being further configured so as to respond to the variable magnetic field provided by the induction device so as to telescopically extend and telescopically retract the in-flight refueling device between a stowed position and an extended position relative to the induction device along the longitudinal axis.

* * * * *